US012148126B2

(12) United States Patent
Sun et al.

(10) Patent No.: US 12,148,126 B2
(45) Date of Patent: Nov. 19, 2024

(54) DATA PROCESSING METHOD FOR RAPIDLY SUPPRESSING HIGH-FREQUENCY BACKGROUND NOISE IN A DIGITIZED IMAGE

(71) Applicant: NATIONAL TAIWAN UNIVERSITY, Taipei (TW)

(72) Inventors: Chi-Kuang Sun, Taipei (TW); Bhaskar Jyoti Borah, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 352 days.

(21) Appl. No.: 17/688,902

(22) Filed: Mar. 8, 2022

(65) Prior Publication Data
US 2023/0153953 A1 May 18, 2023

(30) Foreign Application Priority Data
Nov. 12, 2021 (TW) .................. 110142127

(51) Int. Cl.
*G06K 9/00* (2022.01)
*G06T 3/4007* (2024.01)
(Continued)

(52) U.S. Cl.
CPC .............. *G06T 5/70* (2024.01); *G06T 3/4007* (2013.01); *G06T 5/20* (2013.01); *G06T 5/50* (2013.01);
(Continued)

(58) Field of Classification Search
CPC ........... G06T 5/70; G06T 3/4007; G06T 5/20; G06T 5/50; G06T 5/73; G06T 2207/20224; G06T 5/75
See application file for complete search history.

(56) References Cited

U.S. PATENT DOCUMENTS 5,012,333 A 4/1991 Lee et al.
5,038,388 A 8/1991 Song
(Continued)

FOREIGN PATENT DOCUMENTS

CA 2013750 C * 12/2000 ............. G06T 5/004
CN 102640499 B 12/2014
(Continued)

OTHER PUBLICATIONS

Bharathi, N Santosh, A Sonthosh; "Generalized Unsharp Masking Algorithm for Contrast And Sharpness", International Refereed Journal of Engineering and Science (IRJES), vol. 2, Issure9, Sep. 30, 2013 (Sep. 30, 2013), pp. 73-90, http://www.irjes.com/Papers/vol2-issue9/ECE3%20-%2073-90.pdf.

*Primary Examiner* — Shervin K Nakhjavan
(74) *Attorney, Agent, or Firm* — Li & Cai Intellectual Property Office

(57) ABSTRACT

A data processing method for rapidly suppressing background high frequency noise in a digitized image. The data processing method includes configuring a graphical processing unit to perform a first amplification process, a pixel binning process or a first interpolation process, a first low-pass filtering process, a second interpolation process, a first subtraction process, a second low-pass filtering process, a second amplification process, and a second subtraction process on an input image, so as to subtract a subtraction mask from the input image and generate a noise-suppressed output image.

10 Claims, 7 Drawing Sheets

(51) Int. Cl.
  *G06T 5/20* (2006.01)
  *G06T 5/50* (2006.01)
  *G06T 5/70* (2024.01)
  *G06T 5/73* (2024.01)
(52) U.S. Cl.
  CPC ...... *G06T 5/73* (2024.01); *G06T 2207/20224* (2013.01)

(56) References Cited

U.S. PATENT DOCUMENTS

| | | | | |
|---|---|---|---|---|
| 7,643,019 B2* | 1/2010 | Velthoven | ...... | H04N 5/20 345/204 |
| 7,773,127 B2* | 8/2010 | Zimmer | ...... | H04N 23/80 348/231.6 |
| 7,856,151 B2* | 12/2010 | Lei | ...... | G06T 5/70 375/240 |
| 8,638,342 B2 | 1/2014 | Cote et al. | | |
| 8,731,318 B2* | 5/2014 | Keshet | ...... | G06T 5/73 382/302 |
| 8,989,516 B2* | 3/2015 | Albu | ...... | G06T 5/73 382/167 |
| 9,747,514 B2* | 8/2017 | Lim | ...... | G06T 5/70 |
| 2009/0226108 A1* | 9/2009 | Kent | ...... | G06T 5/70 382/255 |
| 2014/0307978 A1 | 10/2014 | Balestrieri | | |
| 2016/0205342 A1* | 7/2016 | Gohshi | ...... | H04N 7/015 348/441 |

FOREIGN PATENT DOCUMENTS

| | | | | | |
|---|---|---|---|---|---|
| CN | 106954007 A | * | 7/2017 | ...... | G06T 7/20 |
| CN | 111340711 B | * | 9/2020 | ...... | G06N 3/045 |
| JP | H0950520 A | * | 2/1997 | ...... | G06T 5/004 |
| JP | 3070860 B2 | | 7/2000 | | |
| JP | 2005051379 A | | 2/2005 | | |
| WO | WO2013179963 A1 | | 12/2013 | | |

* cited by examiner

DATA PROCESSING METHOD FOR RAPIDLY SUPPRESSING HIGH-FREQUENCY BACKGROUND NOISE IN A DIGITIZED IMAGE

CROSS-REFERENCE TO RELATED PATENT APPLICATION

This application claims the benefit of priority to Taiwan Patent Application No. 110142127, filed on Nov. 12, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a data processing method, and more particularly to a data processing method for rapidly suppressing background high-frequency noise in digitized images.

BACKGROUND OF THE DISCLOSURE

In the process of digitization of an analog signal, due to various instrumental and environmental factors, the digitized data set may become contaminated with high-frequency noise. While certain analog filters are available for improving signal quality, such a configuration usually requires dedicated hardware setups and may limit an effective bandwidth of a signal acquisition system.

SUMMARY OF THE DISCLOSURE

In response to the above-referenced technical inadequacies, the present disclosure provides a data processing method for rapidly suppressing background high-frequency noise in digitized images, which can be used to rapidly suppress high-frequency background noise in the digitized image, and restore target signals that have been contaminated by the high-frequency noise.

In one aspect, the present disclosure provides a data processing method for rapidly suppressing background high-frequency noise in a digitized image, and the data processing method includes configuring a graphical processing unit or a central processing unit to execute following steps: obtaining an input image, wherein the input image has a first width and a first height, and includes a plurality of pixels or data points; performing a first amplification process on the input image to multiply the input image by a first amplification factor, and generate a first amplified image; performing a pixel binning process or a first interpolation process on the first amplified image to resize the first amplified image by a reduction factor to generate a first resized image that has a second width lower than the first width by the reduction factor and a second height lower than the first height by the reduction factor; performing a first Gaussian blur process on the first resized image by performing a convolution operation on the first resized image while using a Gaussian kernel with a first kernel size to obtain a first blurred image; performing a second interpolation process on the first blurred image to upscale the first blurred image from the second width and the second height to obtain a second resized image having the first width and first height; performing a first subtraction process on the second resized image and the first amplified image to subtract the first amplified image from the second resized image, so as to generate a first subtracted image; performing a second Gaussian blur process on the first subtracted image by performing a convolution operation on the first subtracted image while using a Gaussian kernel with a second kernel size to obtain a second blurred image; performing a second amplification process on the second blurred image to multiply the second blurred image by a second amplification factor, and generate a subtraction mask having the first width and first height; and performing a second subtraction process on the input image and the subtraction mask to subtract the subtraction mask from the input image to generate an output image.

Therefore, the data processing method for rapidly suppressing background high-frequency noise in the digitized image provided by the present disclosure has the following advantages:

1. It can be utilized for ultra-high-speed noise suppression without requiring any additional hardware.
2. Different from the traditional blur-based denoising algorithms, there is least effect on a resolution of an original image.
3. In a case where a noise intensity is comparable to or stronger than a target signal intensity, the information of the target signal can be restored with ultra-high-speed processing.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
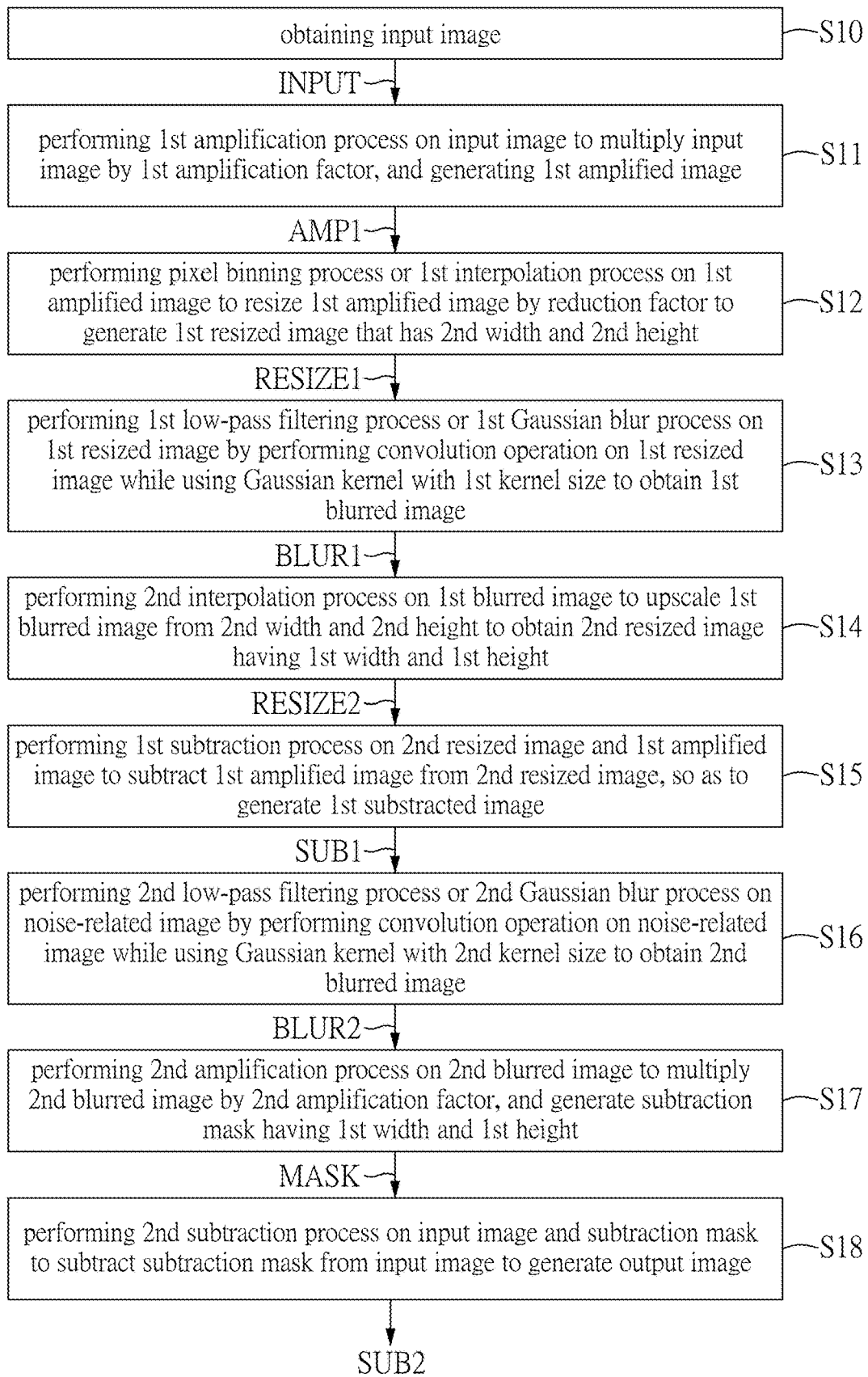
FIG. 1 is a flowchart of a data processing method according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

A high-frequency noisy background is a typical issue in the process of digitization of an analog signal which often degrades the signal-to-noise ratio (SNR). In the contexts of processing speed, effective bandwidth, and real-time applicability, the prior hardware- and software-based relevant techniques might not be adequate for ultra-fast-retrieving of especially a weak-intensity signal of interest contaminated by a strong noisy background. The present disclosure provides a data processing method for rapidly yet efficiently suppressing background high frequency noise in a digitized image.

FIG. 1 is a flowchart of a data processing method according to one embodiment of the present disclosure. Reference is made to FIG. 1, one embodiment of the present disclosure provides a data processing method for rapidly suppressing background high-frequency noise in digitized images. The data processing method can be implemented by a computing device including one or more processors (such as a central processing unit and a graphical processor) and a storage device. For example, the central processing unit and the graphical processor can be configured to access computer readable instructions from the storage device to control the computing device to execute the data processing method provided by the present disclosure.

The storage device can be any storage device that can be used to store data, such as, but not limited to, random access memory (RAM), read only memory (ROM), flash memory, hard disk drive or other storage device that can be used to store data.

The computing device can be implemented by, for example, a database, a general processor, an image processor, a computer, a server, or other unique hardware devices with specific logic circuits or equipment with specific functions, such as a unique hardware that integrates programming codes and processor/chips. In more detail, the data processing method can be realized by using a computer program. The computer program can be stored in a non-transitory computer-readable recording medium, such as read-only memory, flash memory, floppy disk, hard disk, optical disk, Flash drives, magnetic tapes, network-accessible databases, or computer-readable recording media with the same functions can be easily thought of by those skilled in the art.

Reference is made to FIG. 1, the data processing method includes configuring a graphical processing unit to perform the following steps:

Step S10: obtaining an input image INPUT.

The input image INPUT has a first width and a first height, and includes a plurality of pixels or a plurality of data points. In addition, it should be noted that the input image INPUT must be an image that has not been processed by any type of low-pass filter, so as to avoid the high-frequency noise intensities of the original input image INPUT from being distributed to its darker neighbors that causes an inability to generate an effective subtraction-mask in the subsequent steps.

Figure 2:
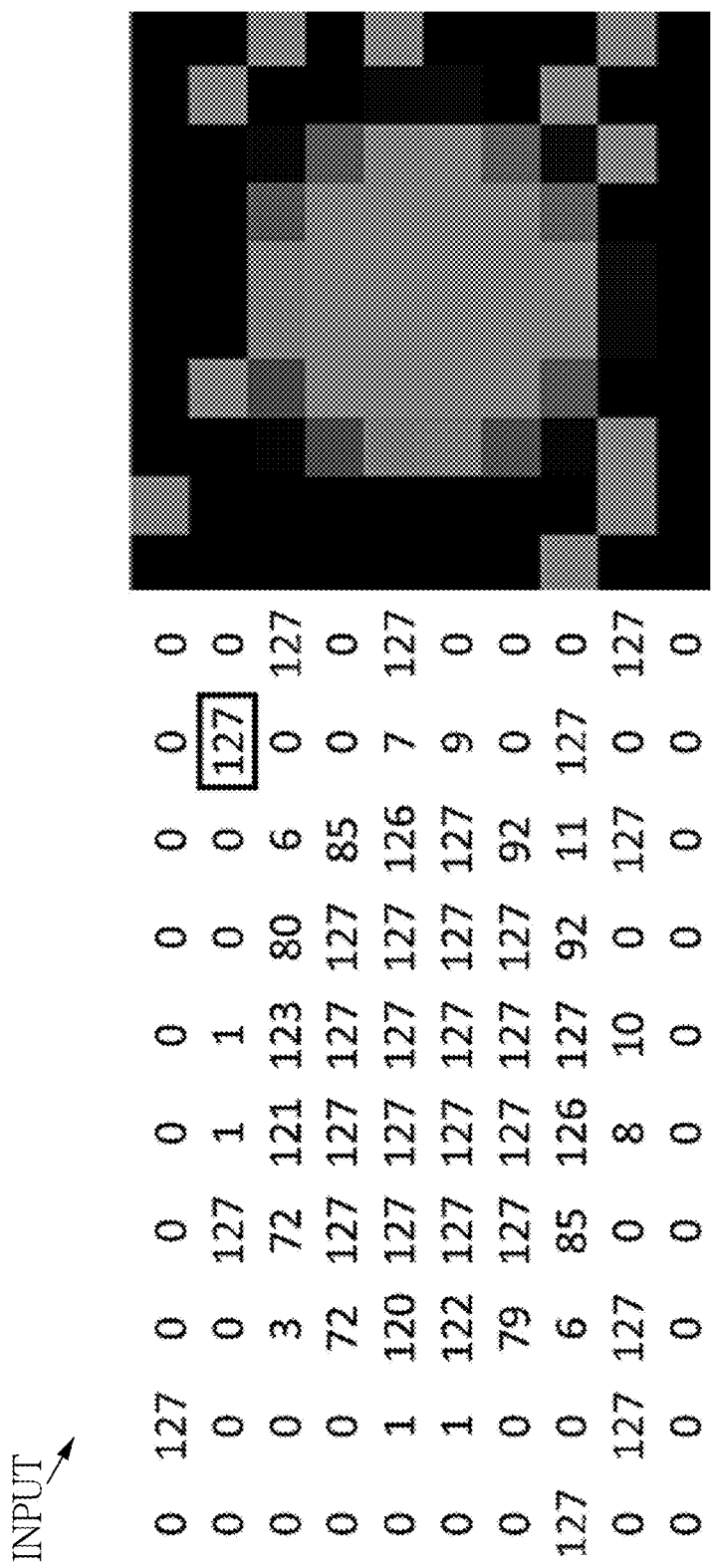
FIG. 2 is a schematic diagram of an input image according to one embodiment of the present disclosure.

Reference is made to FIG. 2, which is a schematic diagram of an input image according to one embodiment of the present disclosure. The input image INPUT can be, for example, an 8-bit grayscale digitized image with 10×10 pixels corresponding to the data points, and a number on each data point represents a grayscale value at that location.

Step S11: performing a first amplification process on the input image INPUT to multiply the input image by a first amplification factor, and generating a first amplified image AMP1. This step is to boost weak-intensity information in the input image INPUT, preferably close to saturation.

The first amplification process can be represented by the following equation (1):

$$g(r,c) = \alpha \times f(r,c) \qquad \text{equation (1);}$$

where f(r, c) is the input image, g(r, c) is the first amplified image, r represents one of positions of the pixels or the data points on a vertical axis, c represents one of positions of the pixels or the data points on a horizontal axis, and $\alpha$ is the first amplification factor. Ideally, the first amplification factor can be chosen as inverse of minimum intensity of interest multiplied by 255.0 for an 8-bit data set. In a preferred embodiment of the present disclosure, a range of the first amplification factor $\alpha$ can be $1.0 < \alpha \leq 5.0$.

Step S12: performing a pixel binning process or a first interpolation process on the first amplified image AMP1 to resize the first amplified image AMP1 by a reduction factor to generate a first resized image RESIZE1 that has a second width and a second height.

Here, the first interpolation process can be used to reduce a size of the first amplified image AMP1.

The pixel binning process or the first interpolation process can be expressed by the following operation (2):

$$g(r, c) \xrightarrow{R \times C \to R' \times C'} g^D(r', c'); \qquad \text{operation (2)}$$

Where R and C respectively represent the first height and the first width, R' and C' respectively represent the second height and the second width, and $g^D(r', c')$ is the first resized image, and r' and c' respectively represent one of the positions of a vertical axis and one of the positions of a horizontal axis of a plurality of pixels or a plurality of data points of the first resized image.

For example, the first enhanced image AMP1 can be applied with the pixel binning process or first interpolation process with the reduction factor of 3, and the obtained first resized image RESIZE1 is substantially a smooth layer of the first amplified image AMP1.

Step S13: performing a first low-pass filtering process or a first Gaussian blur process on the first resized image by performing a convolution operation on the first resized image RESIZE1 while using a Gaussian kernel with a first kernel size to obtain a first blurred image BLUR1.

The first Gaussian blur process can be expressed by the following equation (3):

$$L(r',c')=G_{g1\times g2}\otimes g^D(r',c') \quad \text{equation (3);}$$

Where L(r', c') represents the first blurred image, $G_{g1\times g2}$ represents a Gaussian kernel, g1×g2 represents the first kernel size, and $\otimes$ represents a convolution operation.

Gaussian blur is essentially a low-pass filter, which is widely used in the art of image processing, and is usually used to reduce image noise and reduce the level of detail.

It should be noted that, in order to obtain the smooth layer of the first amplified image AMP1, the first amplified image AMP1 is first reduced by 3 times, and a Gaussian kernel with a first kernel size of, for example, 29×29 is used to perform the first Gaussian blur process. To obtain a similar smooth layer without the pixel binning process or the first interpolation process, a larger Gaussian kernel is required, however, the larger Gaussian kernel is relatively expensive for a moderate to large-sized data set. In the embodiment of the present disclosure, a reduced smoothness of the smooth layer can be helpful to better preserve useful high-frequency information in some applications.

Step S14: performing a second interpolation process on the first blurred image BLUR1 to upscale the first blurred image BLUR1 from the second width and the second height (R'×C') to obtain a second resized image RESIZE2 having the first width and first height (R×C).

The second interpolation process is represented by the following operation (4):

$$L(r', c')\xrightarrow{R'\times C'\to R\times C} L^U(r, c); \quad \text{operation (4)}$$

Where $L^U(r, c)$ is the second resized image RESIZE2.

Similarly, the second interpolation process can be used to enlarge a size of the first blurred image BLUR1.

Step S15: performing a first subtraction process on the second resized image RESIZE2 and the first amplified image AMP1 to subtract the first amplified image AMP1 from the second resized image RESIZE2, so as to generate a first subtracted image SUB1.

Figure 3:
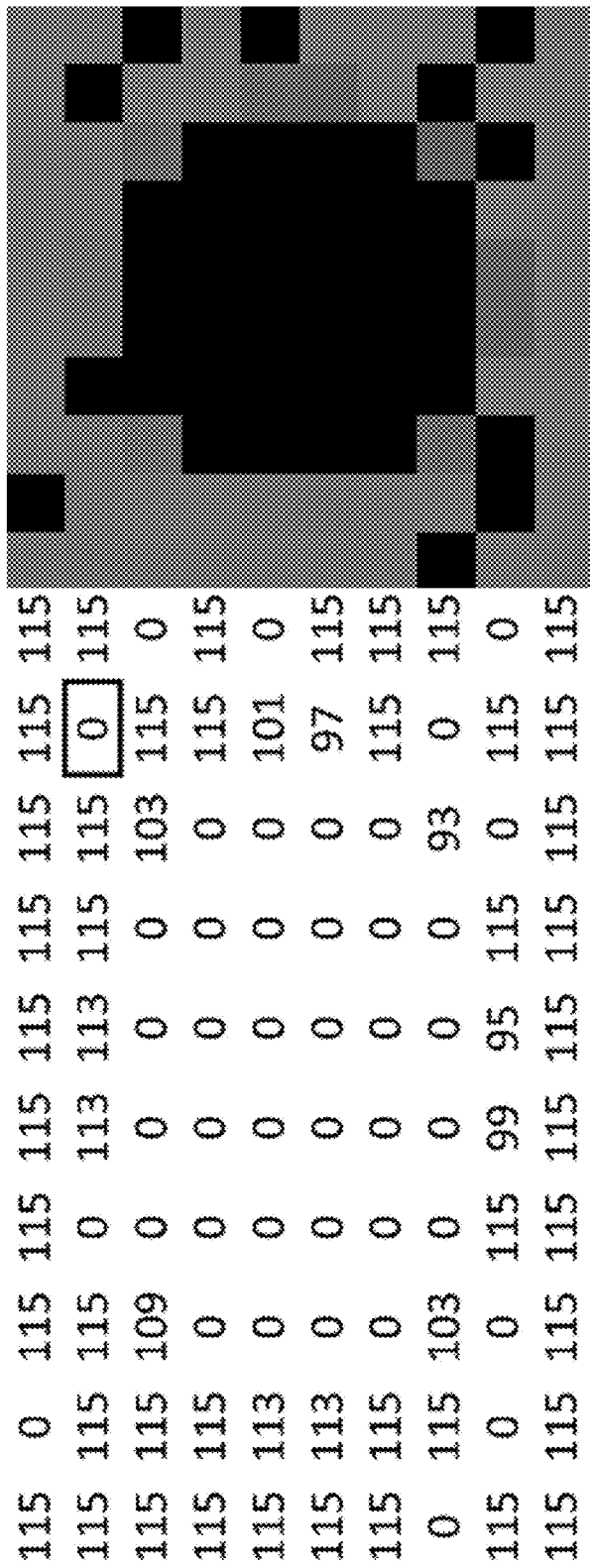
FIG. 3 is a schematic diagram of a first subtracted image according to one embodiment of the present disclosure.

Reference can be further made to FIG. 3, which is a schematic diagram of the first subtracted image SUB1 according to one embodiment of the present disclosure. As shown in FIG. 3, a purpose of step S15 is to yield zero intensities to locations corresponding to the noise and low-frequency structures, while leaving non-zero intensities to the neighbors of the noise. As shown in FIG. 2, a position of a selected frame f(9, 2) is a high-frequency-noise pixel with a value of 127, while the same position of the selected frame in FIG. 3 is zero, and the neighbor blocks of the selected frame attain non-zero intensities. In addition, a low-frequency structure in a central area of FIG. 2 is filled with zeros in FIG. 3. It should be noted that the pixels or data points with negative values that are generated in the first subtraction process are all replaced with zeros.

Step S16: performing a second low-pass filtering process or a second Gaussian blur process on the first subtracted image SUB1 by performing a convolution operation on the first subtracted image SUB1 while using a Gaussian kernel with a second kernel size to obtain a second blurred image BLUR2.

For example, a Gaussian kernel with a second kernel size of M×M (M can be 3, for example) can be used to perform Gaussian blurring on the first subtracted image SUB1 to redistribute non-zero intensities, the purpose of which is to make locations corresponding to the noise (since the neighbors of which are still non-zeros) in the first subtracted image SUB1 to be changed to non-zero values.

Step S17: performing a second amplification process on the second blurred image BLUR2 to multiply the second blurred image BLUR2 by a second amplification factor, and generate a subtraction mask MASK having the first width and first height. For example, the second amplification factor can be 2.0 to strengthen the non-zero values so as to obtain strong enough pixels (data points) corresponding to noisy-background regions.

Figure 4:
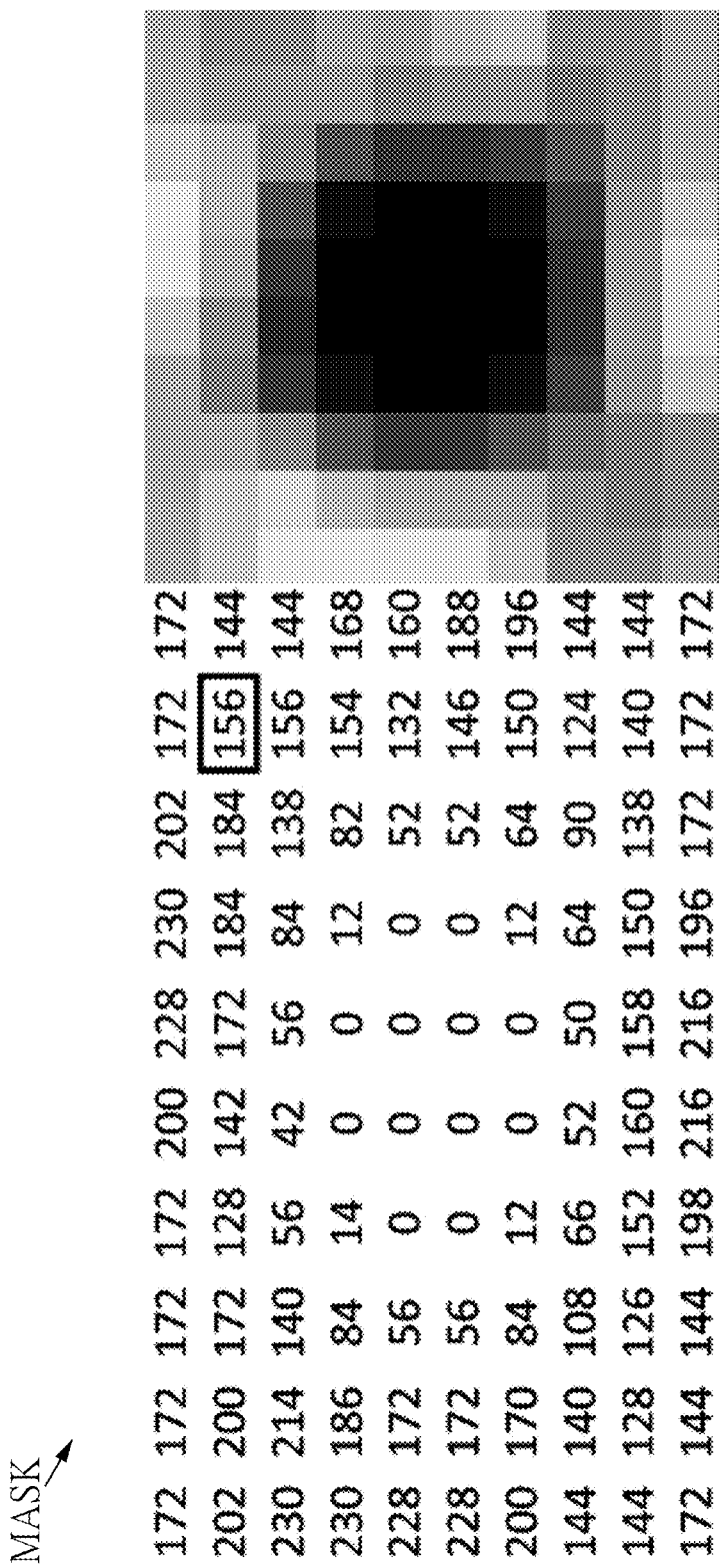
FIG. 4 is a schematic diagram of a subtraction mask according to one embodiment of the present disclosure.

Further reference can be made to FIG. 4, which is a schematic diagram of a subtraction mask according to one embodiment of the present disclosure. As shown in FIG. 4, in the subtraction mask MASK amplified by the second amplification factor, a value of the position of the selected frame mentioned above is 156, which is significantly higher than 127 of the position of the selected frame f(9, 2) in FIG. 2.

Step S18: performing a second subtraction process on the input image INPUT and the subtraction mask MASK to subtract the subtraction mask MASK from the input image INPUT to generate an output image SUB2.

The first subtraction process, the second low-pass filtering process or the second Gaussian blur process, the second amplification process, and the second subtraction process are expressed by the following equation:

$$F(r,c)=f(r,c)-\beta\times[G_{M\times M}\otimes(L^U(r,c)-g(r,c))] \quad \text{equation (5);}$$

where F(r, c) represents the output image, $\beta$ is the second amplification factor, $G_{M\times M}$ is a Gaussian kernel, and M×M is the second kernel size. In a preferred embodiment of the present invention, a range of the second amplification factor is $1.0<\beta\leq10.0$, and a range of the second kernel size can be defined by M, where M=2k+1 following $1\leq k\leq3$.

It should be noted that M must be an odd number greater than 1. For higher noise contamination, a higher value of M can be helpful for suppressing high-frequency noise. Further, depending on noise contamination level, a higher value of the second amplification factor ($\beta$) can be employed.

Figure 5:
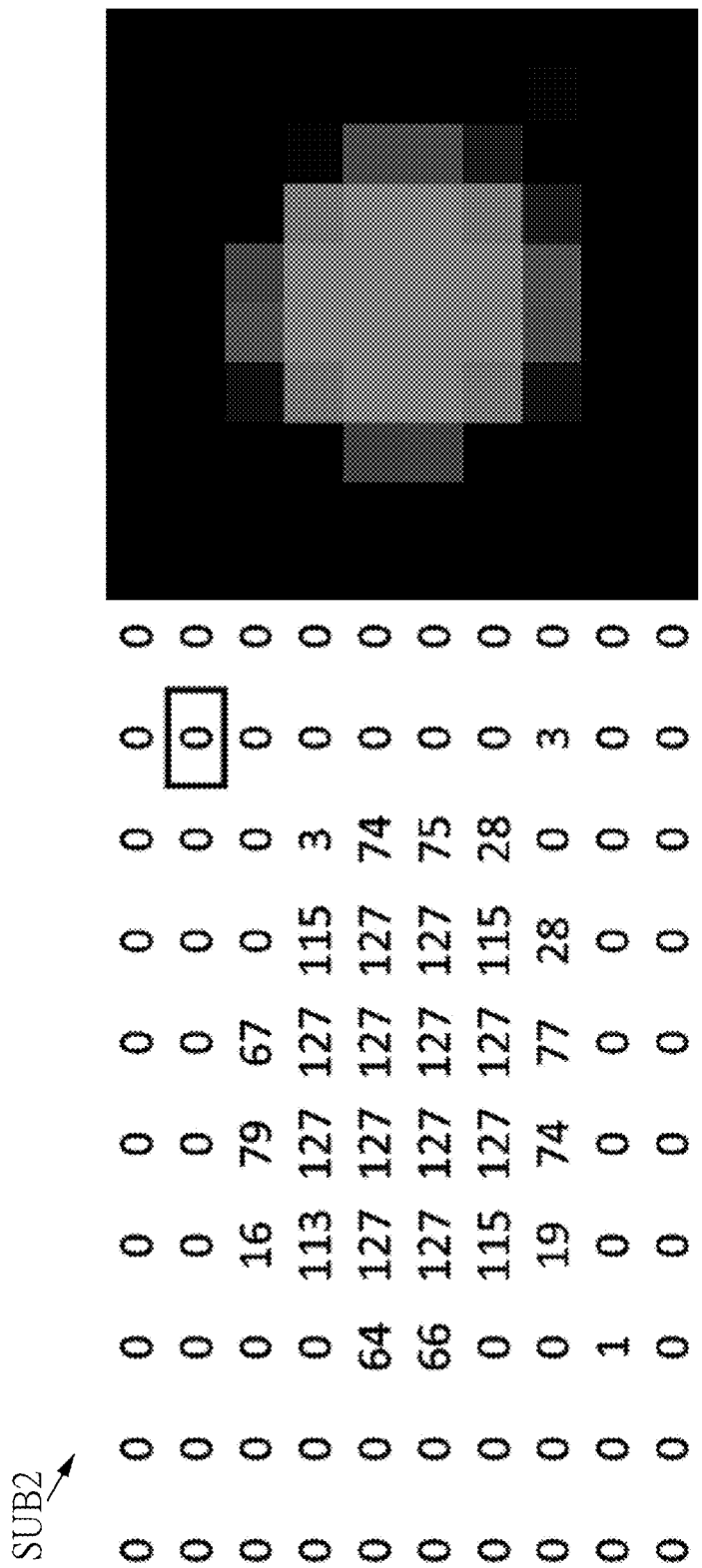
FIG. 5 is a schematic diagram of an output image according to one embodiment of the present disclosure.

Further reference can be made to FIG. 5, which is a schematic diagram of an output image according to one embodiment of the present disclosure. As shown in FIG. 5, after subtracting the subtraction mask MASK from the input image INPUT, the selected frame f(9, 2) of FIG. 2 is reduced to zero at the selected frame F(9, 2) of FIG. 5 while mostly preserving the low-frequency structure at the center.

Figure 6:
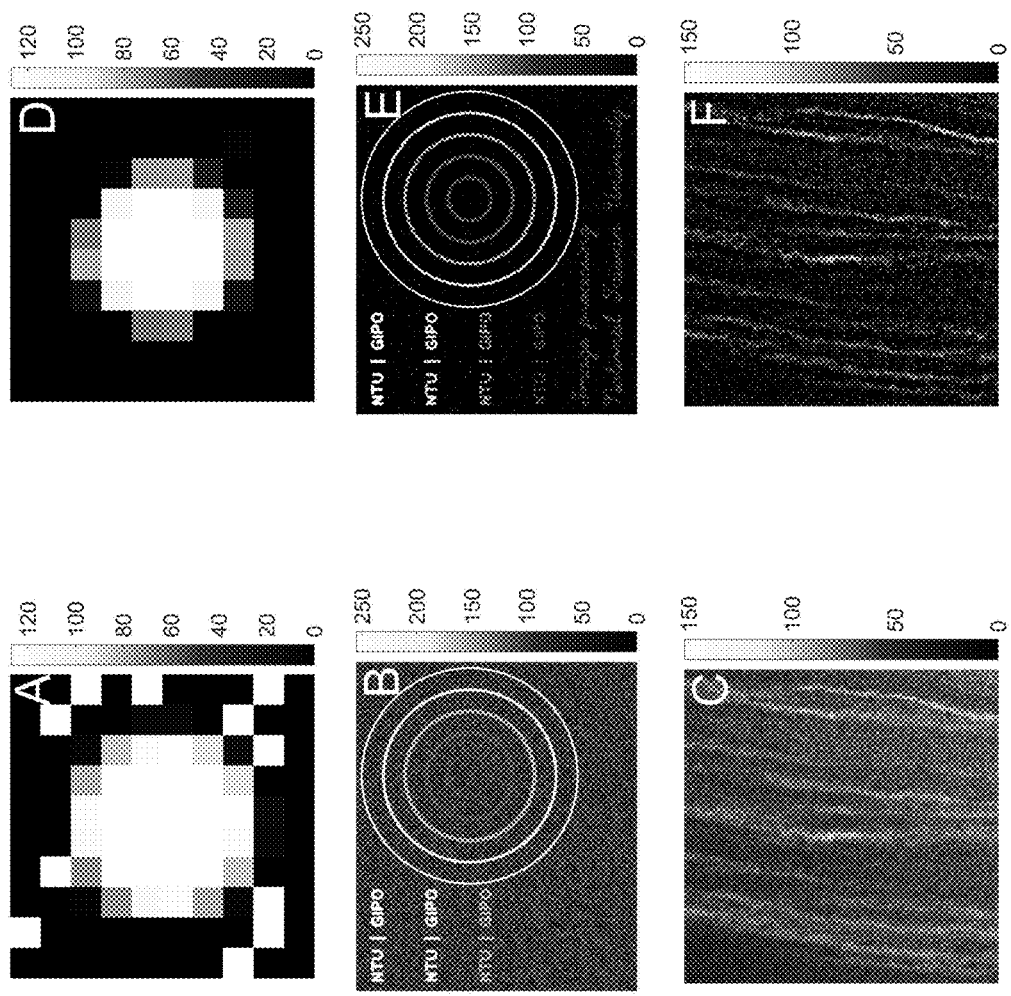
FIG. 6 is a comparison result between an input image set and an image set that is processed by the data processing method of the present disclosure according to one embodiment of the present disclosure.

Further reference can be made to FIG. 6, which is a comparison result between an input image set and an image set that is processed by the data processing method of the present disclosure according to one embodiment of the present disclosure. In FIG. 6, A, B, and C are noise-contaminated images. However, when the data processing method of the present disclosure is applied, it can be seen that in the three images marked with D, E, and F, noise can be effectively suppressed and information of the target signal can be effectively restored.

In addition, to assess the processing speed, one embodiment of the present disclosure further performs the data processing method of the present disclosure on i7-9800X CPU and two CUDA-enabled GPUs which are Quadro P1000 and Quadro RTX 8000 with CUDA core numbers of 640 and 4608, respectively.

Figure 7:
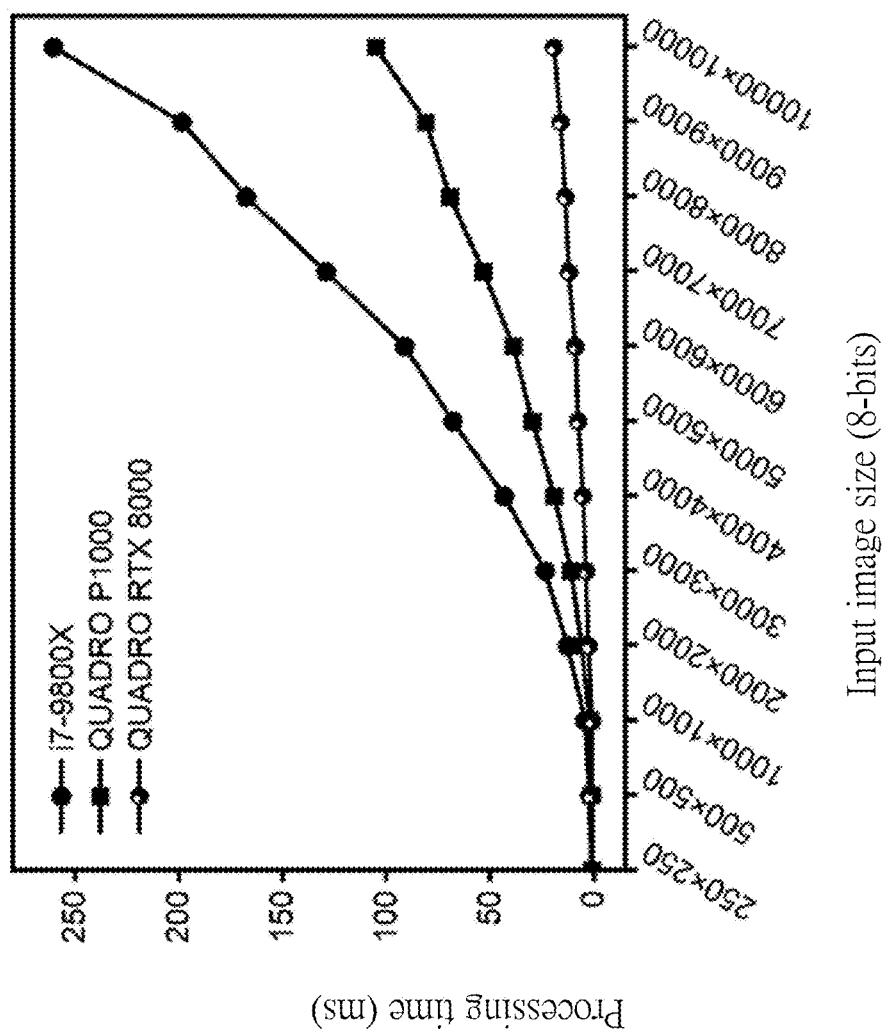
FIG. 7 is a graph illustrating processing times of input image sizes drown for i7-9800X CPU, Quadro P1000 GPU, and Quadro RTX 8000 GPU according to one embodiment of the present disclosure.

FIG. 7 is a graph illustrating processing times of input image sizes drawn for i7-9800X CPU, Quadro P1000 GPU, and Quadro RTX 8000 GPU according to one embodiment of the present disclosure. For a small image size, processing speeds for 9800X, P1000 and RTX 8000 are identical. However, as the image size gets larger, CPU-processing time tends to increase exponentially as depicted by a curve of the i7-9800X CPU. In comparison to the CPU, GPUs such as Quadro P1000 and Quadro RTX 8000 show a significant boost in processing speed.

Furthermore, it can be seen from FIG. 7 that, for 10,000× 10,000 image size (8-bit), an i7-9800X CPU processing time is larger than 250 μs, whereas the same for an RTX 8000 is less than 20 μs, indicating that the RTX 8000 enables at least 12 times better performance. Likewise, the RTX 8000 processing time for a 1000×1000-sized 8-bit image is less than 300 μs. In other words, this can prove that the data processing method for rapidly suppressing background high-frequency noise in digitized images provided by the present disclosure is capable of achieving a sub-half-millisecond processing speed.

Beneficial Effects of the Embodiments

In conclusion, the data processing method for rapidly suppressing background high-frequency noise in the digitized image provided by the present disclosure has the following advantages:

1. It can be used for ultra-high-speed noise suppression up to sub-half-millisecond level without any additional hardware.

2. Different from the traditional blur-based denoising algorithms, there is least effect on a resolution of an original image.

3. In a case where a noise intensity is comparable to or stronger than a target signal intensity, the information of the target signal can be restored with ultra-high-speed processing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A data processing method for rapidly suppressing background high-frequency noise in a digitized image, the data processing method comprising following steps:

obtaining an input image by using a graphical processing unit (GPU) or a central processing unit (CPU), wherein the input image has a first width and a first height, and includes a plurality of pixels or data points;

performing, by using the GPU or the CPU, a first amplification process on the input image to multiply the input image by a first amplification factor, and generate a first amplified image;

performing, by using the GPU or the CPU, a pixel binning process or a first interpolation process on the first amplified image to resize the first amplified image by a reduction factor to generate a first resized image that has a second width lower than the first width by the reduction factor and a second height lower than the first height by the reduction factor;

performing, by using the GPU or the CPU, a first low-pass filtering process on the first resized image to obtain a first blurred image;

performing, by using the GPU or the CPU, a second interpolation process on the first blurred image to upscale the first blurred image from the second width and the second height to obtain a second resized image having the first width and first height;

performing, by using the GPU or the CPU, a first subtraction process on the second resized image and the first amplified image to subtract the first amplified image from the second resized image, so as to generate a first subtracted image;

performing, by using the GPU or the CPU, a second low-pass filtering process on the first subtracted image to obtain a second blurred image;

performing, by using the GPU or the CPU, a second amplification process on the second blurred image to multiply the second blurred image by a second amplification factor, and generate a subtraction mask having the first width and first height; and performing, by using the GPU or the CPU, a second subtraction process on the input image and the subtraction mask to subtract the subtraction mask from the input image to generate an output image.

2. The data processing method according to claim 1, wherein the first amplification process is represented by a following equation:

$$g(r,c)=\alpha \times f(r,c);$$

wherein $f(r, c)$ is the input image, $g(r, c)$ is the first amplified image, r represents one of positions of the pixels or the data points on a vertical axis, c represents one of positions of the pixels or the data points on a horizontal axis, and $\alpha$ is the first amplification factor.

3. The data processing method according to claim 2, wherein $1.0 < \alpha \leq 5.0$.

4. The data processing method according to claim 1 or 2, wherein the pixel binning process or the first interpolation process is expressed by a following operation:

$$g(r, c) \xrightarrow{R \times C \to R' \times C'} g^D(r', c');$$

wherein R and C respectively represent a length of the vertical axis and a length of the horizontal axis of the first height and the first width, R' and C' respectively represent a length of the vertical axis and a length of the horizontal axis of the second height and the second width, and $g^D(r', c')$ is the first resized image, and r' and c' respectively represent one of the positions on the vertical axis and one of the positions on the horizontal axis of a plurality of pixels or a plurality of data points of the first resized image.

5. The data processing method according to claim 1 or 2, wherein the reduction factor is 3.

6. The data processing method according to claim 1, wherein the first low-pass filtering process involves a first Gaussian blur operation performing a convolution expressed by a following equation:

$$L(r',c') = G_{g1 \times g2} \otimes g^D(r',c');$$

wherein L(r', c') represents the first blurred image, $G_{g1 \times g2}$ represents a Gaussian kernel, g1×g2 represents a first kernel size, and ⊗ represents a convolution operation.

7. The data processing method according to claim 6, wherein the first kernel size is 29×29.

8. The data processing method according to claim 1, wherein the second interpolation process is represented by a following operation:

$$L(r', c') \xrightarrow{R' \times C' \to R \times C} L^U(r, c);$$

wherein $L^U(r, c)$ represents the second resized image.

9. The data processing method according to claim 1 or 2, wherein the first subtraction process, the second low-pass filtering process, the second amplification process, and the second subtraction process are expressed by a following equation:

$$F(r,c) = f(r,c) - \beta \times [G_{M \times M} \otimes (L^U(r,c) - g(r,c)];$$

wherein, F(r, c) represents the output image, β is the second amplification factor, and the second low-pass filtering process involves a second Gaussian blur operation performing a convolution with a Gaussian kernel $G_{M \times M}$ having a second kernel size M×M.

10. The data processing method according to claim 9, wherein 1.0<β≤10.0 and M=2k+1 following 1≤k≤3.

* * * * *